Patented Mar. 8, 1938

2,110,816

UNITED STATES PATENT OFFICE 2,110,816

PRODUCTION OF ALCOHOLS FROM PETROLEUM

Joseph J. Pelc, Chicago, Ill.

No Drawing. Application June 3, 1936,
Serial No. 83,405

18 Claims. (Cl. 260—156)

This invention relates to the treatment of aliphatic and cyclic saturated hydrocarbons, either pure or as they occur in mixtures in crude petroleum and distillate fractions thereof, to produce saturated alcohols directly therefrom.

The present process of producing alcohols is an improvement over that described in my prior Patent No. 2,011,199, issued August 13, 1935.

In my prior patent referred to I disclosed the production of saturated alcohols from aliphatic and cyclic saturated hydrocarbons by a treatment involving first mixing under certain conditions a saturated hydrocarbon, or mixture of such hydrocarbons, acetone and sulfuric acid, whereby there is produced a pseudoester or complex of the saturated hydrocarbon, acetone and sulfuric acid. Where a primary saturated hydrocarbon is treated under suitable conditions jointly with acetone and sulfuric acid, a complex is formed substantially in accordance with the following equation:

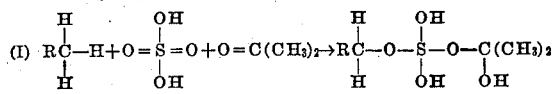

Where a secondary saturated hydrocarbon is similarly treated, a complex is formed substantially in accordance with the following equation:

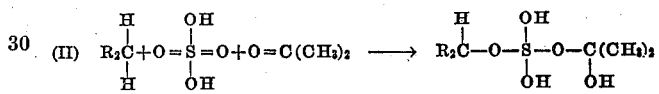

Where a tertiary hydrocarbon is similarly treated, a complex is formed as indicated by the following equation:

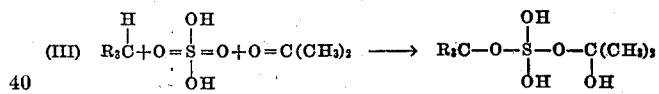

According to the process described in my prior patent, saturated alcohols are produced from these pseudoesters or complexes by neutralizing the mixture formed in the initial treatment, as with soda ash or the like, and diluting the resulting mass with water. As a result of this treatment, the pseudoester or complex initially formed is decomposed with the liberation of a saturated alcohol formed from the hydrocarbon originally treated, the sulfuric acid separating as an alkali-forming metal sulfate and the acetone content of the complex being liberated as isopropyl alcohol. As described in my prior patent, the saturated alcohol formed may be separated from the mass, after which the alkali-forming metal sulfate and isopropyl alcohol may, if desired, be converted back to sulfuric acid and acetone, respectively, for reuse in the further practice of the process.

I have discovered that it is possible to simplify the process of my former patent and avoid the trouble and expense incident to the neutralizing treatment referred to above, and to increase the yield of alcohols, by converting the above mentioned pseudoesters or complexes directly into alcohols by treating the same with water under certain conditions, the water serving as a decomposing agent for the pseudoesters, converting them into saturated alcohols, sulfuric acid and isopropyl alcohol, following which the mass may be diluted with additional water and the alcohols separated, as by steam distillation and fractionation.

The pseudoester or complex produced in accordance with Equation I can be simply decomposed by water into a primary alcohol, sulfuric acid and isopropyl alcohol, as follows:

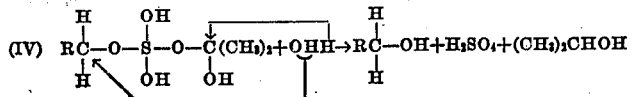

Similarly, a pseudoester or complex produced in accordance with Equation II may be decomposed by water into a secondary alcohol, sulfuric acid and isopropyl alcohol, as follows:

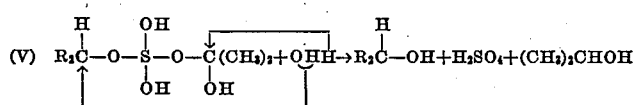

Likewise, a pseudoester or complex produced in accordance wtih Equation III may be converted into a tertiary alcohol, sulfuric acid and isopropyl alcohol, as follows:

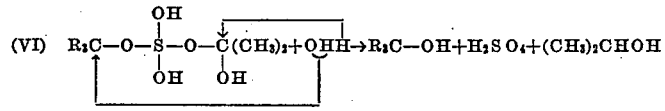

It is evident that the reactions indicated by Equations I, II and III are reversible and that under ordinary conditions the products of these reactions would have the tendency to revert to their original components, as is indicated by the following equation, for example:

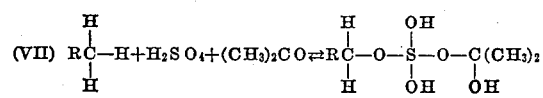

For this reason only small amounts of the alcohols would actually be formed under ordinary conditions. However, I have discovered that the equilibrium may be shifted under certain conditions whereby the reactions are not readily reversible, with the result that the maximum amounts of alcohols may be formed and isolated.

It is to this formation of a complex of a saturated hydrocarbon, acetone and sulfuric acid, and the simple decomposition by water of this complex with the direct production of a saturated alcohol that the present invention relates.

The principal object of the present invention is to provide an improved method for the catalytic carbonylation of aliphatic and cyclic saturated hydrocarbons for the production of aliphatic and cyclic saturated alcohols.

An important object of the present invention is to provide a simple, efficient and commercially practicable process of producing saturated alcohols from aliphatic and cyclic saturated hydrocarbons, and particularly from crude petroleum or distillate fractions thereof.

Another object of the present invention is to provide for the production from aliphatic and cyclic saturated hydrocarbons, acetone and sulfuric acid, pseudoesters or complexes thereof, and decomposing such pseudoesters or complexes by water with the production of saturated alcohols formed from the hydrocarbons treated.

Other objects and advantages of the invention will become apparent during the course of the following description.

In the practice of the present invention an aliphatic or cyclic saturated hydrocarbon, or mixtures thereof, such as crude petroleum or distillate fractions thereof, is treated with acetone and sulfuric acid under such conditions that the saturated hydrocarbon or hydrocarbons, the acetone and the sulfuric acid will react together to produce a pseudoester or complex composed of the three materials, as indicated by Equations I, II and III, and the reaction product formed is converted into a saturated alcohol by adding water to the reaction mass under conditions favorable to the production of an alcohol from the reaction product, after which the mass is further diluted with water, if necessary, to retard or prevent reaction between the alcohol formed and other reagents present in the mass. In order to secure optimum results, the treatment must be conducted under carefully regulated conditions, as will more fully hereinafter appear.

As indicated above, the present process is applicable for the production of a saturated alcohol from any aliphatic or cyclic saturated hydrocarbon, whether gaseous, liquid or solid. Moreover, the process is not confined to the treatment of pure, individual hydrocarbons but is particularly applicable to the treatment of crude petroleum and distillate fractions thereof to convert saturated hydrocarbons present therein into saturated alcohols. As will become apparent, where the process is applied to petroleum or other mixtures of hydrocarbons, the product formed will include a mixture of alcohols derived from the saturated hydrocarbons present in the mixture but, as hereinafter pointed out, these alcohols may be separately recovered from the mixture if desired. Several different examples of the present process as applied to both pure and mixed saturated hydrocarbons are described below. It is sufficient to point out here that the process is generally applicable to individual or mixed aliphatic or cyclic saturated hydrocarbons. While the hydrocarbons treated may have unsaturated hydrocarbons present therewith without defeating the purpose of the present invention, the instant process is not intended for the treatment of unsaturated hydrocarbons and it is preferable to practice the present invention in conjunction with saturated hydrocarbons which are relatively free from unsaturated hydrocarbons.

As stated, the material to be treated is subjected to the joint action of acetone and sulfuric acid. In preferred practice, it is desired that the reaction mass be comparatively free from water and, therefore, I prefer to employ pure, dry acetone and a quite highly concentrated sulfuric acid. For commercial operation I recommend the use of 95% sulfuric acid but an acid having a concentration as low as 80% sulfuric acid may be used with some measure of success.

In treating the hydrocarbon material jointly with acetone and sulfuric acid, the acetone present should be in at least equimolecular proportion with respect to the sulfuric acid in order to secure the formation of the desired pseudoester or complex. However, the acetone employed may be, and ordinarily is, in chemical excess with respect to the sulfuric acid.

For best commercial operation I recommend the use of at least three molecular equivalents of acetone and at least three molecular equivalents of sulfuric acid for each molecular equivalent of saturated hydrocarbon treated. Where a mixture of saturated hydrocarbons is treated, the molecular equivalent mentioned refers back to the pure hydrocarbons present in the material and is used in this sense throughout the present description.

Generally, the acetone and sulfuric acid are used substantially in excess of the proportions above indicated, as will more fully hereinafter appear. However, it is not necessary to use an excess of acetone and sulfuric acid. As a matter of fact, while it is preferred to treat one molecular equivalent of saturated hydrocarbon material with at least three molecular equivalents of acetone and at least three molecular equivalents of sulfuric acid, the acetone and sulfuric acid may be used in much smaller proportion, in which case, of course, a smaller proportion of saturated hydrocarbon material present will be reacted upon, with the consequent reduction in the yield of alcohols after treatment of the mass with water as hereinafter described.

For example, is has been found experimentally that if a given amount of the hydrocarbon material is treated with less than the preferred amounts of acetone and sulfuric acid, any desired degree of alcoholization may be produced. According to the hereinafter described preferred method of operation, the average yield of alcohols is approximately 80% of the theoretical amount producible from the hydrocarbon material treated, some hydrocarbons producing almost 100% of the theoretical amount of alcohols, while other hydrocarbons yield as low as 60% of the theoretical amount. However, as stated, it may be expected that in the preferred practice of the invention there will be produced, on the average, alcohols in amounts of approximately 80% of theoretical amounts. However, if only 50% of the preferred amounts of acetone and sulfuric acid are employed to treat the same amount of hydrocarbon material, the alcoholization is reduced to about 40 to 50%. Where only 10% of the preferred amounts of acetone and sulfuric acid were employed to treat the same amount of hydrocarbon material, the alcoholized samples showed about 5 to 10% total yield of alcohols and this was reduced to from ½ of 1% to 1% where only 1% of the preferred amounts of acetone and alcohol where employed.

It will thus be apparent that it is possible to treat one molecular equivalent of hydrocarbon material with even less than one molecular equivalent of each of acetone and sulfuric acid and still obtain partial conversion of the hydrocarbon material treated. Obviously, it is ordinarily desirable to obtain the maximum yields of alcohols from the hydrocarbons treated and, therefore, it is recommended that the acetone and sulfuric acid be used in excess of the amounts required to react with the hydrocarbon material treated to form the desired pseudoesters or complexes. The excess acetone and sulfuric acid may be separated and recovered for reuse in the further practice of the process.

In treating the hydrocarbon material with acetone and sulfuric acid it is desirable to conduct the treatment in a closed container and maintain the reaction mass at a temperature below the boiling point of acetone in order that the acetone and the volatile hydrocarbons may not be completely driven off from the mass and thereby prevent the formation of the desired reaction product. As a matter of fact, the use of temperatures approaching the boiling point of acetone are not suited for commercial practice since only a small yield will be obtained.

In preferred practice, the temperature of the reaction mass is customarily kept below 15° C. by external cooling of the reaction vessel with ice, running water or the like. When liquid hydrocarbons are being treated the temperature of the reaction mass may be permitted to rise as high as from 10 to 15° C. without materially reducing the ultimate yield of alcohols. However, the use of temperatures in the neighborhood of 0° C. is recommended. Where gaseous hydrocarbons are to be treated, it is preferred to dissolve these in the acetone employed and maintain the container under pressure, say a pressure of 1 to 2 atmospheres, and keep the temperature of the reaction mass at as low a point as feasible, say from −15° C. to −20° C. However, where gases are being treated which are very soluble in acetone, it may be found unnecessary to maintain the container under pressure or to use sub-zero temperatures.

In order to insure the desired reaction between the hydrocarbon material, acetone and sulfuric acid, and prevent side reactions between the acetone and sulfuric acid, it is important to secure intimate mixing of all three materials by constant agitation. This agitation should be continued without stopping from the time the materials are originally mixed until after the formation of the alcohols has been completed, as hereinafter described. This constant agitation is of great importance and this operating condition should be carefully observed in the practice of the process.

After the reaction between the hydrocarbon material, acetone and sulfuric acid to form the complex has been completed, which can be readily determined by testing the reaction mix to ascertain whether it contains any saturated hydrocarbon material which has not been reacted upon, the agitation of the mass is continued and water is gradually added to the mass, preferably in quite small amounts and at spaced intervals, in an amount sufficient to completely hydrolyze the pseudoester or complex formed with the production of a saturated alcohol from the saturated hydrocarbon originally treated and with the liberation of sulfuric acid, as such, and acetone in the form of isopropyl alcohol.

As is well known, the addition of water to sulfuric acid results in very substantial thermal evolution and a similar generation of heat occurs when water is added to the reaction mass in the present process. If, in the practice of the present process, water is added too rapidly, the temperature of the reaction mass will rise above the maximum optimum temperature, which tends to reverse the equilibrium of the reaction and form the original components. Moreover, if a very great excess of water is added the pseudoester or complex formed, if it does not revert to its original components, ordinarily will not undergo hydrolysis to form alcohols in any substantial amount. Some of these pseudoesters or complexes are insoluble in water and are quite stable in water or in very dilute acid solution, with the result that care must be exercised to avoid the excessive addition of water to reduce the acid concentration of the mass to a point below that favorable to the hydrolysis of the complex.

In general, there should be added to the reaction mass sufficient water to supply the hydroxyl groups for the formation of an alcohol from the pseudoester or complex (sulfuric acid and isopropyl alcohol being formed simultaneously) and the water should be added sufficiently gradually to avoid a sudden rise of temperature above the optimum operating temperature or, in any case, above a temperature which would tend to reverse the equilibrium to form the original components of the reaction. As will be apparent, the lower the temperature of the reaction mass, the greater will be the amount of water which may be safely added at a given time. In commercial operation, the addition of the water should be regulated so that the temperature of the mass will not rise above say 10 to 15° C.

The addition of water for effecting the decomposition of the pseudoesters or complexes with the formation of saturated alcohols not only serves that function but it serves the further function of decomposing into acetone or isopropyl alcohol any mesityl oxide or pinacones which may have been formed from the acetone. However, it has been determined that in the preferred practice of the process as hereinafter described there is no formation of mesityl oxide, pinacones or other condensation products of acetone.

When water is added in the above described manner to the mass containing the pseudoesters or complexes, the latter or hydrolyzed, yielding saturated alcohols, sulfuric acid and isopropyl alcohol in accordance with Equations IV, V and VI set forth above. However, if the resulting mass is permitted to stand without further treatment the alcohols present may be reacted upon by other reagents present in the mass, such as sulfuric acid. Therefore, it is desirable to dilute the mass with an excess of water to provide a solution of low concentration in order that reaction between the alcohols and other reagent or reagents present may be retarded or prevented. Thereafter, the mass is preferably permitted to stand for a period of several hours, and preferably over night, after which the alcohols may be separated in any conventional way, as by steam distillation and fractionation.

It will thus be apparent that my present process comprises reacting together an aliphatic or cyclic saturated hydrocarbon to produce a reaction product which is hydrolyzable with the production of a saturated alcohol formed from the hydrocarbon treated, and subsequently converting the reaction product into a saturated alcohol by the addition of water to the mass. In this connection it is to be noted that it has been found from experience that the hydrolysis of the complexes does not appear to follow the rules for the hydrolysis of alkyl sulfates inasmuch as the complexes can yield substantially higher amounts of primary alcohols than would be anticipated on the basis of the rules of hydrolysis of alkyl sulfates.

The following is a description of the general procedure followed in the preferred practice of the present invention.

The treatment of the hydrocarbon material to be converted into a saturated alcohol or alcohols is conducted in an acid-proof container which is provided with efficient agitating means and which preferably may be tightly closed to prevent escape of gases. Practically any good mixer provided with motor-driven agitating paddles will be found suitable. The mixer is preferably provided with a tight fitting top which preferably has mounted therein a detachable pipe extending down into the container to a point adjacent the bottom thereof for the purpose of introducing reagents into the mixer. The mixer is preferably provided with an ice jacket or water jacket. If desired, the mixer may merely be mounted in a larger container through which running-water may be circulated or into which ice or a freezing mixture may be introduced for the purpose of cooling a reaction mass being treated in the mixer.

Where the hydrocarbon material to be converted into an alcohol or alcohols is gaseous, such gaseous material is preferably dissolved in acetone and the resulting solution mixed with sulfuric acid in the mixer which is kept operating during the mixing and also thereafter until the process has been completed. In this case, a low freezing mixture is introduced into the surrounding cooling jacket in order to keep the mass at a low temperature, and preferably around 15 to 20° below zero centigrade. Also, the mixer may be put under pressure, of say 1 to 2 atmospheres.

For ordinary operation, as when treating hexane or higher hydrocarbons, the temperature of the reaction mass may be kept down merely by circulating running water through the jacket surrounding the reaction vessel.

In general practice, 100 parts (all "parts" referred to herein being parts by weight) of a pure saturated hydrocarbon or of a mixture of saturated hydrocarbons, which are preferably free from unsaturated compounds, are treated with from 1 to 800 parts, and about 600 parts on an average, of 95% sulfuric acid and from 1 to 500 parts, and about 200 parts on an average, of acetone which is substantially free from water. In ordinary operation when treating liquid or solid hydrocarbon material, measured amounts of the hydrocarbon material and the sulfuric acid are introduced into the mixer, which has preferably been thoroughly dried inside, and the mixing is immediately started. The acetone is then introduced into the agitated mixture through the pipe carried by the cover of the mixer in order to introduce the acetone into the mix below the level thereof. The acetone is introduced first in small portions and later in somewhat larger portions if desired. In any event, the mixing of the acetone with the mixture of hydrocarbon material and sulfuric acid must take slowly, say over a period of from 5 to 10 minutes, in order to prevent the evaporation of acetone from the mixture or formation of clouds of acetone in the mixer.

After the introduction of the acetone, the inlet pipe through which the acetone was added is closed and the cover fitted tightly to substantially seal the apparatus. The agitating and cooling of the mass is continued uninterruptedly until the reaction of the three materials to form a complex thereof has been completed, and also thereafter. This ordinarily requires not less than two hours and it is preferred to continue the treatment for about 3 to 4 hours to form the complexes.

After this reaction has been completed, the agitating and cooling is continued while from 1 to 60 parts, and about 30 parts on an average, of water are added gradually to the mass to decompose the complex or complexes therein. In preferred practice, the water is added to the mixer through the pipe employed for introducing the acetone. In preferred practice, there is first added to the mass in the mixer from 1 to 10% water based on the weight of the acid used, and preferably about 3% water. The mixer is again closed and the mixing continued for 1 to 2 hours longer while cooling the mass. Thereafter, about the same amounts of water are added twice or three times, the mixing after and during each addition of water being continued for about one-half hour to one hour before the further addition of water. Ordinarily, the total time of treatment from the beginning of the operation until the completion of the addition of the water to hydrolyze the complex is about 6 to 8 hours. In general practice, the water is added under such conditions that the 95% sulfuric acid originally used is gradually reduced by periodic additions of water in amounts of 2 to 3% based on the weight of the acid used until the acid strength has been brought down to approximately 85%, or to approximately 75% if it is desired to preserve all tertiary alcohols present in the mass.

As stated above, the regulated addition of water as described results in the decomposition of the complex or complexes present into a saturated alcohol or alcohols. After sufficient amount of water has been added to effect the desired hydrolysis, the stirring of the mass is continued and additional water is added to dilute the mass to about from 10 to 75% acid concentration, and preferably about 50% acid concentration. The addition of the water for dilution may ordinarily be considerably more rapid than the addition of the first amounts of water added to effect hydrolysis as described. Generally, it will be satisfactory to add the diluting water over a period of from 5 to 10 minutes. After adding the diluting water, the mixing is continued for a few more minutes, or long enough to make certain that the mixture will remain cool when agitation is discontinued. Thereupon, the stirring is discontinued.

In preferred practice, the mass resulting from the treatment described above is permitted to stand for one or two hours, and preferably over night, after which it is preferably subjected to steam distillation. Practically all the alcohols below the $C_{12}$ series come over with the excess acetone in the steam distillation. This distillate is dried in conventional manner (excluding, of course, such drying agents as calcium chloride) and when the distillate is perfectly dry, the acetone together with any lower undecomposed hydrocarbons present is slowly evaporated below the boiling point of acetone, and preferably at a temperature not exceeding 50° C. The evaporation of the evaporated acetonic mixture may be repeated and the remaining alcohols are fractionated in the usual way. In some cases they may be washed with small amounts of water, care being taken not to remove the water-soluble alcohols which readily dissolve in dilute acetone.

The alcohols remaining in the residual acid mixture after the steam distillation are removed in any conventional way from the residual mixture. If present as sulfates they are decomposed. These saturated alcohols are dried and then fractionated under vacuum.

Practically all of the isopropyl alcohol produced in the process remains in the residual acid mixture with the diluted sulfuric acid. The isopropyl alcohol can be separated and recovered in conventional manner and, if desired, converted back to acetone for further use in the practice of the process. Similarly, the sulfuric acid can be recovered for reuse. In this connection, it will be apparent that the sulfuric acid serves as a catalyst for the carbonylation of the saturated hydrocarbons treated, the sulfuric acid being present as such at the conclusion of the treatment. Accordingly, the present process may properly be said to involve the catalytic carbonylation of saturated hydrocarbons to produce saturated alcohols.

While, as pointed out above, I prefer to employ concentrated sulfuric acid as a catalyst or activating agent in the practice of the present invention, I have found that acid-forming sulfur oxides, such as sulfur trioxide, may be employed in place of the sulfuric acid with a satisfactory measure of success and, accordingly, acid-forming sulfur oxides are to be considered as equivalents of the sulfuric acid specifically recited in the appended claims.

For the sake of specific illustration of the practical application of the present invention, several examples or different embodiments of the process are set forth below.

*Example 1*

10 parts of ethane may be dissolved in 30 to 60 parts, and preferably about 40 parts, of acetone under a pressure of 1 to 2 atmospheres and treated with 78 parts of 95% sulfuric acid with agitation at a temperature of −15° C. for approximately 3 hours. Thereafter, while continuing the agitation, 25 parts of water may be added in small amounts at intervals over a period of about 2 hours. Thereafter, 100 parts of water are added in somewhat greater amounts at intervals over a period of 2 hours. Thereafter, agitation of the mixture may be discontinued and the diluted mass treated to recover ethyl alcohol therefrom. In this treatment the yield of ethyl alcohol was approximately 60% of the theoretical amount producible from the ethane treated.

*Example 2*

According to this embodiment of the process, 100 parts of low boiling ether, i. e. one that starts boiling at about 30° C., was treated in the general manner described above with 600 parts of 95% sulfuric acid and 260 parts of acetone. Upon the completion of the initial reaction approximately 30 parts of water of decomposition were added in the above described manner, from 20 to 36 parts of water of decomposition being suitable in this case. Thereafter, 500 parts of water were added to dilute the mass. In this case the total time of treatment was 6 hours. The diluted mass was then allowed to stand over night and then subjected to steam distillation. The yield of alcohols boiling between about 80° C. to about 200° C. was approximately 80%. The lowest boiling alcohol detected was trimethylcarbinol having a boiling point of 83° C. The mixture produced by this treatment contained primary, secondary and tertiary alcohols, the primary alcohols predominating and the tertiary being in very small quantity. The resinous matter produced was about 2%.

*Example 3*

A high boiling ether, i. e. one that starts boiling at about 50° C., was treated in the same manner as described above under the preceding example and gave practically the same results, but of the total mixture more of primary octyl, nonyl and even decyl alcohol in traces were observed, the boiling point of the alcoholic mixture being from about 82° C. to about 230° C.

Example 4

Substantially pure hexane, heptane, octane and small amounts of nonane and decane treated in substantially the same way gave substantially the same results.

Example 5

Natural gasoline or any other gasoline which is fairly free from unsaturated hydrocarbons when treated in the same manner as described under Example 2, will produce yields of alcohols as high as 90%.

Example 6

The foregoing examples are concerned with the production of as high a yield of alcohols as possible from the hydrocarbon material treated. In certain cases, it may be desired only to partially alcoholize a hydrocarbon material. For example, it is advantageous in certain cases to partially alcoholize fuel for internal combustion engines and the present example is concerned with the partial alcoholization of gasoline.

100 parts of natural gasoline, as well as other gasolines not containing excessive amounts of olefines, were treated with 60 parts of 95% sulfuric acid and 26 parts of acetone at a temperature of about 10° C. until the desired reaction was complete, after which three parts of water of decomposition were added to the resulting mass and 50 to 60 parts of water of dilution were thereafter added. The total time of treatment was between 5 and 6 hours. Alcohols measured analytically in numerous samples were, on an average, in the amount of 7%. In some samples the alcohols were as high as 10% while in others they were only 5%. Tests for sulfur in such samples were negative and several gallons of the treated gasoline stored for a period of over one year did not develop any resinous matter. In the original treated samples the gum was from 1 to 3% and was removed by the treatment.

Example 7

When 100 parts of gasoline were treated in the same manner as described in Example 6 but with only from 5 to 10 parts of sulfuric acid and from 2 to 5 parts of acetone, the resulting product was exceptionally pure and by analytical measurements the average alcoholic content was about 0.4%, some samples running as high as 1%.

Example 8

As a representative of mixed aliphatic and cyclic saturated hydrocarbons, kerosene consisting of about 75% of naphthenes was treated. 100 parts of this material were treated with 450 parts of 95% sulfuric acid, 200 parts of acetone, 25 parts of water of decomposition, and 450 parts of water of dilution. The temperature during treatment was maintained below 15° C. and the total time of treatment was 5½ hours. There was obtained a yield of about 80% liquid, mostly naphthenic alcohols, among them cyclohexyl alcohol, and about 15% solid or semisolid alcohols, among them traces of hexadecanols. The remainder consisted of some sulfur compounds, resins and other impurities.

It is to be noted that when the time of original mixing before the addition of the water of decomposition was extended to about 6 to 7 hours, lower naphthenic alcohols, such as cyclopropanol, were also formed due probably to the splitting of more complex naphthenes. Practically the same treatment can be applied to higher hydrocarbons such as are found, for example, in paraffin oils or petroleum jellies. Solid alcohols of higher series were readily isolated.

It is also to be noted that, as in the case of gasoline, as described in Examples 6 and 7, it is possible to secure any desired degree of alcoholization of kerosenes, paraffines, or crude oil distillates merely by the reduction of the amounts of acetone and sulfuric acid originally employed.

Example 9

As an example of the treatment of an isolated saturated cyclic hydrocarbon, cyclohexane was treated in the same manner as described above in Example 2 and there was produced cyclohexanol having a boiling point of 160° C. to the amount of about 80%.

Example 10

The present process is applicable to the production of saturated alcohols from petroleum oils both in crude and in distilled state. As will be apparent, the conditions of treatment will vary considerably according to the particular oil treated but in any case fairly good results will be obtained by the use of the following general formula:

Treat 100 parts of crude oil with 400 to 600 parts of 95% sulfuric acid and 220 to 250 parts of acetone. Add water of decomposition to the extent of about 3% of the weight of sulfuric acid used. Thereafter, dilute gradually to an acid concentration of 40 to 50%. The time of treatment may vary from 4 to 6 hours depending upon whether lower alcohols are to be simultaneously produced or if only higher alcohols are to be obtained. A typical crude oil treated in this way gave a yield of liquid and solid alcohols of 75%.

As will be apparent from the foregoing my present process provides a simple and efficient method of producing saturated alcohols from aliphatic and cyclic saturated hydrocarbons. The process is not only relatively rapid and economical in operation but it avoids the difficulties heretofore encountered in proposed methods of producing alcohols from hydrocarbons by such treatments as oxidation, nitration and chlorination. With many hydrocarbons substantially quantitative yields of alcohols may be produced and in all cases high yields are obtainable. Accordingly, the present process is particularly adapted for commercial application in the production of alcohols from saturated hydrocarbons.

While I have described in detail the preferred practice of my present invention and several modifications thereof, it is to be understood that the details of procedure may be variously modified without departing from the spirit of the invention or the scope of the subjoined claims.

I claim:

1. The process which comprises reacting together a hydrocarbon compound selected from the group consisting of aliphatic and cyclic saturated hydrocarbons, acetone and sulfuric acid, and gradually mixing the resulting mass with water substantially in the absence of a neutralizing agent.

2. The process which comprises agitating a mixture of a hydrocarbon compound selected from the group consisting of aliphatic and cyclic saturated hydrocarbons, acetone and sulfuric acid while maintaining the mass at a temperature below the boiling point of acetone, and thereafter, while continuing the agitation, adding water gradually to the mass substantially in the absence of a neutralizing agent.

3. The process which comprises agitating a mixture of a hydrocarbon compound selected from the group consisting of aliphatic and cyclic saturated hydrocarbons, acetone and sulfuric acid while maintaining the mass at a temperature below 15° C., and thereafter, while continuing the agitation, adding water gradually to the mass substantially in the absence of a neutralizing agent.

4. A process for converting aliphatic saturated hydrocarbons into aliphatic saturated alcohols and for converting cyclic saturated hydrocarbons into cyclic saturated alcohols which comprises the steps of reacting together the saturated hydrocarbon to be converted into an alcohol, acetone and sulfuric acid, and converting the resulting reaction product into a saturated alcohol by the action of water thereon substantially in the absence of a neutralizing agent.

5. A process for converting aliphatic saturated hydrocarbons into aliphatic saturated alcohols and for converting cyclic saturated hydrocarbons into cyclic saturated alcohols which comprises the steps of treating the saturated hydrocarbon to be converted into an alcohol jointly with acetone and sulfuric acid to form a complex of such compounds which is hydrolyzable with the formation of a saturated alcohol, and, substantially in the absence of a neutralizing agent, gradually mixing the mass with water in an amount sufficient to decompose said complex with the formation of a saturated alcohol.

6. A process for converting aliphatic saturated hydrocarbons into aliphatic saturated alcohols and for converting cyclic saturated hydrocarbons into cyclic saturated alcohols which comprises the steps of reacting together the saturated hydrocarbon to be converted into an alcohol, acetone and sulfuric acid, the acetone being present in at least equimolecular proportion with respect to the sulfuric acid, thereafter converting the reaction product formed into a saturated alcohol by the action of water thereon substantially in the absence of a neutralizing agent, and diluting the resulting mass to retard reaction of the alcohol formed with other reagents present.

7. A process for converting aliphatic saturated hydrocarbons into aliphatic saturated alcohols and for converting cyclic saturated hydrocarbons into cyclic saturated alcohols which comprises the steps of subjecting the saturated hydrocarbon to be converted into an alcohol to the joint action of acetone and sulfuric acid while agitating the mass and maintaining the same at a temperature below the boiling point of acetone, the acetone being present in at least equimolecular proportion with respect to the sulfuric acid, and thereafter, while continuing the agitation, adding water gradually to the resulting mass substantially in the absence of a neutralizing agent.

8. A process for converting aliphatic saturated hydrocarbons into aliphatic saturated alcohols and for converting cyclic saturated hydrocarbons into cyclic saturated alcohols which comprises the steps of subjecting the saturated hydrocarbon to be converted into an alcohol to the joint action of acetone and sulfuric acid while agitating the mass and maintaining the same at a temperature not exceeding 15° C., the acetone being present in at least equimolecular proportion with respect to the sulfuric acid, continuing the agitation while gradually adding to the resulting mass water, substantially in the absence of a neutralizing agent, in an amount sufficient to convert the reaction product formed into a saturated alcohol, and continuing the addition of water to dilute the resulting mass.

9. A process for converting aliphatic saturated hydrocarbons into aliphatic saturated alcohols and for converting cyclic saturated hydrocarbons into cyclic saturated alcohols which comprises the steps of reacting together the saturated hydrocarbon to be converted into an alcohol, acetone and sulfuric acid, and mixing the resulting mass with water while maintaining the mass at a temperature not exceeding 15° C.

10. A process for converting aliphatic saturated hydrocarbons into aliphatic saturated alcohols and for converting cyclic saturated hydrocarbons into cyclic saturated alcohols which comprises the steps of agitating a mixture of acetone, sulfuric acid and the saturated hydrocarbon to be converted into an alcohol while maintaining the mass at a temperature not exceeding 15° C., the acetone being present in at least equimolecular proportion with respect to the sulfuric acid, and while continuing the agitation, adding water to the mass under conditions such that the temperature thereof is not raised substantially above 15° C.

11. A process for converting aliphatic saturated hydrocarbons into aliphatic saturated alcohols and for converting cyclic saturated hydrocarbons into cyclic saturated alcohols which comprises the steps of reacting together the saturated hydrocarbon to be converted into an alcohol, acetone and sulfuric acid, mixing the resulting mass with water in an amount sufficient to convert the reaction product formed into a saturated alcohol while maintaining the mass at a temperature not exceeding 15° C., and diluting the resulting mass with water.

12. A process for converting aliphatic saturated hydrocarbons into aliphatic saturated alcohols and for converting cyclic saturated hydrocarbons into cyclic saturated alcohols which comprises the steps of agitating a mixture of acetone, sulfuric acid and the saturated hydrocarbon to be converted into an alcohol while maintaining the mass at a temperature not exceeding 15° C., the acetone being present in at least equimolecular proportion with respect to the sulfuric acid, continuing the agitation while adding water to the mass under conditions such that the temperature thereof is not raised substantially above 15° C., and diluting the resulting mass by the further addition of water.

13. A process for converting aliphatic saturated hydrocarbons into aliphatic saturated alcohols and for converting cyclic saturated hydrocarbons into cyclic saturated alcohols which comprises the steps of subjecting the saturated hydrocarbon to be converted into an alcohol under conditions of agitation to the joint action of acetone and sulfuric acid at a temperature not exceeding 15° C. to convert said compounds into a complex composed thereof, continuing the agitation while gradually adding to the mass water in an amount sufficient to decompose said complex with the production of a saturated alcohol while maintaining the mass at a temperature not exceeding 15° C., and continuing the agitation while diluting the resulting mass to retard reaction of said saturated alcohol with other reagent present.

14. The process which comprises combining a saturated hydrocarbon selected from the group consisting of aliphatic and cyclic saturated hydrocarbons, acetone and sulfuric acid into a pseudoester, and directly hydroxylating the hydrocarbon content and hydrogenating the acetone content of said pseudoester to decompose the same into a saturated alcohol, sulfuric acid and isopropyl alcohol.

15. A process for converting a saturated hydrocarbon selected from the group consisting of aliphatic and cyclic saturated hydrocarbons, into a saturated alcohol which comprises combining said saturated hydrocarbon with acetone and sulfuric acid into a complex having the general type formula

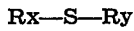

wherein Rx is the saturated hydrocarbon, S is sulfuric acid, and Ry is acetone, and directly decomposing said complex by hydrolysis into a saturated alcohol, sulfuric acid and isopropyl alcohol.

16. A process for converting a saturated hydrocarbon selected from the group consisting of aliphatic and cyclic saturated hydrocarbons, into a saturated alcohol which comprises mixing with agitation said saturated hydrocarbon, substantially dry acetone and a sulfuric acid having a concentration of at least 80%, the acetone being in at least equimolecular proportion with respect to the sulfuric acid, maintaining the mass at a temperature not exceeding 15° C. while continuing the agitation, periodically adding water in amounts insufficient to cause the temperature of the mass to rise substantially above 15° C. while continuing the agitation, and thereafter adding a further amount of water to dilute the mass.

17. The process of producing saturated alcohols from saturated hydrocarbons present in a petroleum product selected from the group consisting of crude oil and distillate fractions thereof which comprises mixing the petroleum product under conditions of agitation with sulfuric acid and acetone which is in at least equimolecular proportion with respect to the sulfuric acid, maintaining the mass at a temperature not exceeding 15° C. while continuing the agitation, and gradually adding water to the mass while maintaining the same under conditions of agitation and at a temperature not exceeding 15° C.

18. The process of producing saturated alcohols from saturated hydrocarbons present in a petroleum product selected from the group consisting of crude oil and distillate fractions thereof which comprises mixing the petroleum product under conditions of agitation with concentrated sulfuric acid and substantially dry acetone, which is in at least equimolecular proportion with respect to the sulfuric acid, maintaining the mass at a temperature not exceeding 15° C. while continuing the agitation, periodically adding water in amounts insufficient to cause the temperature of the mass to rise substantially above 15° C. while continuing the agitation, and thereafter diluting the mass with water.

JOSEPH J. PELC.